United States Patent [19]

Tu et al.

[11] Patent Number: 4,622,225

[45] Date of Patent: Nov. 11, 1986

[54] METHOD OF PREPARING YEAST-LEAVENED BREAD CRUMBS

[75] Inventors: Chia-Chi Tu, Danville, Calif.; Ronald P. Wauters, Brookfield, Conn.; Ralph E. Kenyon, Belle Mead, N.J.

[73] Assignee: General Foods Corporation, White Plains, N.Y.

[21] Appl. No.: 795,025

[22] Filed: Nov. 4, 1985

[51] Int. Cl.$^4$ ............................................. A21D 13/00
[52] U.S. Cl. ........................................ 426/27; 426/19; 426/549
[58] Field of Search ............................ 426/27, 19, 549

[56] References Cited

U.S. PATENT DOCUMENTS

| | | | |
|---|---|---|---|
| 3,870,803 | 3/1975 | Siems et al. | 426/128 |
| 4,207,346 | 6/1980 | Wauters et al. | 426/19 |
| 4,218,480 | 8/1980 | Dyson et al. | 426/19 |
| 4,364,961 | 12/1982 | Darley et al. | 426/19 |
| 4,423,078 | 12/1983 | Darley et al. | 426/549 X |
| 4,440,793 | 4/1984 | Seki | 426/549 |

*Primary Examiner*—Joseph Golian
*Attorney, Agent, or Firm*—Sam D. Walker; Thomas R. Savoie; Daniel J. Donovan

[57] ABSTRACT

A method of preparing yeast-leavened bread crumbs suitable for use in a stuffing mix. A fully developed bread dough which has a generally low water content of not more than 60% based on flour weight, is sheeted and baked in sheet form. The dough sheet has a thickness of ¼ to ¾ inches. Proofing of the dough is limited to provide a baked sheet having a density of from 17 to 36 pounds per cubic feet. After cooling, the baked bread sheet is subjected to staling for a maximum of ten hours. The staled sheet is then divided into bread crumbs. The entire process, after providing the developed dough, is preferably carried out in not more than twelve hours. The short processing time is largely attributable to the relatively short staling period.

9 Claims, No Drawings

METHOD OF PREPARING YEAST-LEAVENED BREAD CRUMBS

BACKGROUND OF THE INVENTION a. Field of the Invention

This invention relates to the preparation of yeast-leavened bread crumbs suitable for use in a stuffing mix composition. It is desirable that such bread crumbs have an acceptable flavor, strong cell structure, and relatively high density.

Among the problems encountered by the prior art in producing satisfactory bread for stuffing is that when the bread crumbs are added to the other contents of a stuffing mix and hydrated during a cooking process, there is a tendency for the individual crumbs to lose their identity and for the bread portion of the stuffing mix to become a pasty mass. The result can be a very pasty and unsatisfactory stuffing. It is thus desirable that the bread crumbs utilized in the stuffing mix have a high density and strong cell structure in order to stand up to the processing and cooking conditions to which stuffings are subjected.

b. Prior Art

In general, when it was desired to produce bread crumbs having a higher density for utilization in the production of prepackaged stuffing mixes, such crumbs were obtained by simply compressing ordinary baked bread in order to decrease the volume, followed by the steps of staling, slicing and cubing the bread. The crumbs resulting from such processes when added to a stuffing mix and hydrated had a tendency to break down and lose their identity in one mass of pasty stuffing.

In the customary processes of making bread, whether the sponge, continuous or the straight dough method is adopted, the dough is generally subjected to an intermediate proofing and also a final pan-proofing in order for the dough to rise to its desired baking height and to allow the yeast to enhance the flavor of the product. Formation of minute cells and their expansion in the dough during proofing as well as during baking (oven spring) in the usual bread baking process is largely responsible for the resulting delicate cell structure and when utilized in a stuffing mix can produce a pasty and undesirable stuffing which results when hydration takes place.

One way to avoid the foregoing problem is disclosed in Wauters et al., U.S. Pat. No. 4,207,346. The process disclosed therein involves mixing a yeast containing a bread dough to a fully developed state, resting the fully developed dough, and then dividing the dough. Thereafter the dough is baked. During baking, the dough is initially subjected to a temperature sufficiently high and for a period of time effective to kill the yeast and prevent substantial oven spring, and then baking is continued until the bread dough is fully baked. The process is carried out either without a proofing step or with a minimal proofing step prior to baking of the dough, the proofing and oven spring being limited so that the density of the resultant baked bread is within the range of about 17 to 36 lbs./cubic foot. Then the baked bread is staled, sliced and diced into crumbs suitable for use in a stuffing mix.

While the process of the Wauters et al. patent produces good bread crumbs, the process is fairly time-consuming, particularly in the staling step which typically requires 1 to 4 days.

SUMMARY

It is an object of the present invention to provide a process for rapid preparation of yeast-leavened bread crumbs suitable for use in a stuffing mix. It is another object of the invention to provide such a process in which the staling time is shortened to not more than ten hours and preferably not more than six hours. It is another object of the invention to provide such a process in which the process, starting with the developed bread dough and through the step of drying the bread crumbs, is effected in not more than twelve hours, preferably not more than eight hours.

The foregoing and other objects which will be apparent to those of ordinary skill in the art are achieved in accordance with the present invention by providing a fully developed, yeast-leavened bread dough, said bread dough being made from a bread-making formulation containing flour, yeast, and not more than 60% by weight water based on the weight of the flour;

allowing the dough to rest for a time sufficient to enable the dough to withstand physical shaping during sheeting without tearing;

sheeting the dough to form a dough sheet having a thickness of about ¼ inch to ¾ inch;

proofing the dough sheet for a time sufficient to provide a baked bread sheet having a density of from 17 to 36 pounds per cubic foot;

baking the dough sheet at an initial temperature which is sufficiently high and for a period of time effective to kill the yeast within said dough while additionally preventing substantial rising of the dough during said baking, thereafter continuing the baking until the bread dough is fully baked, thereby producing a baked bread having a density within the range of about 17 to 36 lbs./cubic foot;

cooling the baked bread sheet to ambient temperature;

staling the cooled bread sheet for a maximun of ten hours;

dividing the staled bread sheet into bread crumbs having a size suitable for use as a stuffing mix; and drying the bread crumbs to a moisture content of not more than 15% by weight.

DETAILED DESCRIPTION OF PREFERRED EMBODIMENTS

The expression "bread crumbs" used herein means bread particles which may be irregular or regular in shape and which have a size customary for use in a stuffing mix. Suitable regular shape crumbs include cubes ¼ inch to ¾ inch on a side. The crumbs preferably pass through a screen with 1 inch openings and may have the following typical size distribution:

15% by weight retained on a Tyler 2.5 mesh screen
65% by weight retained on a #14 U.S. standard mesh screen
20% by weight pass through a #14 U.S. standard mesh screen but are retained on a #50 U.S. standard mesh screen The process of this invention includes the formation of a yeast containing bread dough, the formation or development of the dough being typically carried out by either the sponge, continuous or the straight dough method, mixing the dough to a substantially fully developed state, then allowing the dough to rest for a time sufficient to enable the dough to withstand physical shaping during sheeting without tearing and to allow the development of the gluten and flavor. Thereafter the dough is divided, rounded (balled), sheeted, and then baked (pan or hearth), while still in sheet form. During baking the dough is initially subjected to a temperature sufficiently high for a period of time effective to kill the yeast and prevent substantial oven spring and then continuing baking until the bread dough is fully baked. This process is carried out either without a proofing step or with a minimal proofing step prior to the baking of the dough, and the proofing and oven spring are limited so that the density of the resultant baked bread is within the range of about 17 to 36 lbs./cubic foot. The baked bread is then staled for a relatively short period in accordance with the invention. The staled bread is then divided (sliced and diced) into crumbs suitable for use in a stuffing mix.

The bread dough useful in the present invention can be of any of the conventional yeast-leavened bread doughs including those made by the straight-dough, sponge-dough or continuous mix methods. However, in accordance with the present invention, the water content of the dough is kept relatively low and not in excess of 60% by weight based on flour weight. These doughs generally contain flour, yeast, water and other conventional yeast-leavened bread dough ingredients such as salt, sugar, shortening, milk or milk substitutes, mold inhibitor, oxidizing agent, color and other conventional ingredients and additives. With the exception of the water content—which is generally low in accordance with the invention—the amounts of the ingredients are conventional. Preferably the dough formulation is relatively low in fat or shortening (less than 4%) as generally the lower the fat or shortening content the firmer the resultant baked bread. The amount of water is kept as low as possible while being sufficient to hydrate the flour and to provide a bread dough capable of being processed in accordance with the present invention. The amount of water is generally not more than 60% of the flour weight and is preferably less. A minimum of about 50% is generally required and a maximum of about 58% is preferred while a maximum of 55% is more preferable.

The type of flour employed in the instant invention can be one employed in making bread, e.g., wheat, rye, corn, soy, rice, potato, peanut, etc. However, preferably the flour has a low alpha-amylase (malt enzyme) activity, a high protein content and a low ash content to aid the formation of a strong cellular structure which in turn helps prevent the resultant bread crumbs from becoming a pasty mass when incorporated into a stuffing mix and hydrated. The alpha-amylase activity is measured by the malt index as determined using an amylograph (recording viscometer). The malt index of the flour being at least about 1000 and preferably at least about 1500. The protein content of the flour is preferably at least 9% by weight of the flour (as calculated on a 14% moisture basis), and the ash content is preferably at most about 0.5% by weight of the flour (as calculated on a 14% moisture basis). Depending on the flour employed, additional ingredients may be added as is common in the art, such as vital wheat gluten.

After the dough has been mixed to full development and rested, the dough can optionally be remixed or reworked prior to dividing the dough. The dough is generally remixed or reworked where additional degassing is needed to obtain the required density and cell structure in the resultant baked bread. In certain dough formulations, such as a formulation with a high corn meal content or lean formulations (low in fat, milk and sugar), the requisite density and cell structure may be obtained without a remixing or reworking step. However, in dough formulations where there is substantial yeast action during the resting step, a remixing or reworking step for an effective period of time is required to degas the dough in order to obtain the required density and cell structure. The remixing or reworking being carried out without over mixing which can result in a sticky or pasty dough which is difficult to handle.

The fully developed dough is then sheeted, either continuously or in a batchwise manner. In the latter event, the developed dough is first divided into pieces having a size suitable for handling. Since the dough is sheeted and subsequently baked in sheet form, it is preferable to divide the dough into relatively small pieces, of say, not more than 100 ounces, preferably not more than 40 or 50 ounces. In either type of process, the dough is permitted to rest prior to sheeting for a time sufficient to withstand physical shaping without tearing. When the dough is divided for batchwise processing, it is preferably balled in a conventional manner prior to this resting step. A rest time of not more than one half hour, preferably not more than 20 minutes, is generally sufficient.

The dough is then sheeted, using conventional dough-sheeting equipment, to a thickness of $\frac{1}{4}$ to $\frac{3}{4}$ inch, preferably $\frac{1}{2}$ to $\frac{3}{4}$ inch. In a conventional breadmaking process, the sheeted dough is then rolled into a loaf size. However, in the present process, the rolling step is eliminated and the dough is retained in sheet form during the subsequent baking step.

The dough is sheeted using conventional dough sheeting equipment. However, after sheeting, the dough remains in sheet form and is not rolled or otherwise shaped in loaf form. The sheet can be of any shape, such as round, oval or oblong and its length and width are both generally much greater than its thickness. A minimum length and width of about 10 or 12 inches is generally satisfactory and length can be much greater. If the dough is not divided into pieces, it is sheeted into an essentially continuous piece having a width of 10 or 12 inches or more.

The dough sheet is then proofed to an extent needed to provide a baked dough sheet having a density of 17-36 pounds per cubic foot, preferably 23-31 pounds per cubic foot. It is preferred to keep proofing time to a minimum to minimize the overall processing time. Thus, the conventional proofing steps are eliminated if possible and at best minimized. The combination of any intermediate and final proofing are thus limited so that the density of the resultant baked bread sheet is within the range of about 17 to 36 lbs./cubic foot, preferably within the range of about 23 to 31 lbs./cubic foot. While preferably such intermediate or final proofing steps are eliminated, some minimal proofing can be tolerated while still obtaining a crumb with the required density and structural strength.

The dough is then baked at an initial temperature which is sufficiently high and for a period of time effective to kill the yeast within said dough while additionally preventing substantial rising of the dough during said baking, thereafter continuing the baking until the bread dough is fully baked, thereby producing a baked bread sheet having a density within the range of about 17 to 36 lbs./cubic foot.

Generally, such initial baking temperature should be at least 375° F. (375°–425° F. being preferred), with the period of time the dough is initially subjected to such temperature being dependent upon factors, such as dough weight and whether the dough is baked on a pan or by the hearth method, as such factors affect the period of time effective to kill the yeast. After the dough is subjected to the sufficiently high temperatures for an effective period of time, the remaining baking cycle can be carried out at conventional temperatures, e.g., baking temperatures of about 350° F. and above.

The baking step herein is similar to that disclosed in Wauters et al., U.S. Pat. No. 4,207,346. However, because the dough is in sheet form, the baking times and temperatures are generally less. For example, a bake temperature of 390° F. for 25 minutes is quite sufficient to fully bake the dough. Accordingly, while the baking step herein is described as involving an initial phase followed by continued baking, it should be understood that it is not necessary to reduce oven temperature for the continued baking phase. The sheet is unrestrained during baking and is not held under tension or the like.

After baking, the bread is cooled by conventional means, preferably exposure to room temperature conditions. Since the baked bread is in sheet form, cooling is generally rapid.

The bread is then staled in conventional manner, but for not more than ten hours, preferably not more than six hours, and more preferably not more than two hours.

The stale bread sheet is divided into bread crumbs with conventional slicing, dicing and cubing equipment. The bread crumbs are then dried to a moisture content of less than 15%, preferably 4–7%, and finally packaged.

Crumbs made according to the process of the present invention have a density in the range of about 12 to 22 lbs./cubic foot, preferably about 15 to 20 lbs./cubic foot, in contrast to the density range of crumbs or cubes from bread prepared according to the usual processes which generally have a density of 9 to 12 lbs./cubic foot.

It is preferred that the entire process, after the developed dough is provided and through the step of drying the bread crumbs, is effected in not more than twelve hours, more preferably in not more than eight hours, and most preferably in not more than five hours.

The bread crumbs produced by the present process can be used in any conventional manner such as in a stuffing mix. A suitable stuffing mix is disclosed in U.S. Pat. No. 3,870,803, the disclosure of which is incorporated herein by reference.

ILLUSTRATIVE EMBODIMENT

A straight dough is prepared with the following formulation:

| Ingredient | Weight Percent |
| --- | --- |
| Flour | 100.0 |
| Sugar | 6.2 |
| Shortening | 2.7 |
| Salt | 2.1 |
| Milk Substitute | 1.4 |
| Yeast | 1.8 |
| Calcium Propionate | 0.3 |
| Water | 55.0 |

The flour, sugar, salt, yeast, milk substitute, shortening and calcium propionate are manually added to the mixer. The mixer is started in low speed while the water is being added. After all the water is added, the mixer is started in high speed, and the dough is mixed for 8 minutes. The temperature of the dough is 80° to 86° F. at the end of this step. The developed dough is transferred to a trough and allowed to ferment at ambient temperature for 70 minutes. The fermented dough is separated into loaf size pieces scaled to 40±½ oz. and then rounded for balling. After balling, the dough pieces are rested for 5 to 10 minutes to withstand subsequent physical shaping without tearing during sheeting. The dough is then sheeted and deposited in pans as a sheet and without curling. The dough sheet is kept at $\frac{5}{8}'' \pm \frac{1}{8}''$ in thickness. Final proofing of the dough sheet takes place in the pan at ambient temperature for 30 minutes. The proofed dough sheets are transferred to the oven shelves for baking at 390° F. for 35 minutes. The crust is nut brown in color. The baked bread sheet is depanned, cooled, racked, and allowed to stale for about two hours at ambient conditions. The stale bread is then chopped into 4 to 6 pieces and diced with an Urschel model "G" dicer. The dicer settings may be varied as necessary to maintain proper dicer discharge granulations. The diced bread crumbs are dried at 225° F. for 5 to 7 minutes to a 4–7% moisture content. The bread crumbs retain their integrity when used in a stuffing mix.

What is claimed is:

1. A method of preparing yeast-leavened bread crumbs suitable for use in a stuffing mix comprising:
   providing a fully developed, yeast-leavened bread dough, said bread dough being made from a breadmaking formulation containing flour, yeast, and about 50% to 60% by weight water based on the weight of the flour;
   allowing the dough to rest for a time sufficient to enable the dough to withstand physical shaping during sheeting without tearing;
   sheeting the dough to form a dough sheet having a thickness of about ¼ inch to ⅜ inch;
   proofing the dough sheet for a time sufficient to provide a baked bread sheet having a density of from 17 to 36 pounds per cubic foot;
   baking the dough sheet at an initial temperature which is sufficiently high and for a period of time effective to kill the yeast within said dough while additionally preventing substantial rising of the dough during said baking, thereafter continuing the baking until the bread dough is fully baked, thereby producing a baked bread having a density within the range of about 17 to 36 lbs./cubic foot;
   cooling the baked bread sheet to ambient temperature;
   staling the cooled bread sheet for a maximum of ten hours;
   dividing the staled bread sheet into bread crumbs having a size suitable for use as a stuffing mix; and
   drying the bread crumbs to a moisture content of not more than 15% by weight.

2. A method according to claim 1 wherein said staling step is effected for a maximum of six hours.

3. A method according to claim 1 wherein said staling step is effected for a maximum of two hours.

4. A method according to claim 1 wherein the entire process, after providing the developed dough and through the step of drying the bread crumbs, is effected in not more than twelve hours.

5. A method according to claim 1 wherein the entire process, after providing the developed dough and through the step of drying the bread crumbs, is effected in not more than eight hours.

6. A method according to claim 1 wherein the entire process, after providing the developed dough and through the step of drying the bread crumbs, is effected in not more than five hours.

7. A method according to claim 1 wherein said breadmaking composition contains not more than 58% by weight water.

8. A method according to claim 1 wherein said breadmaking formulation contains not more than 55% by weight water.

9. A method according to claim 1 wherein said fully developed bread dough is prepared by the straight dough method.

* * * * *